United States Patent [19]

Iwamoto

[11] Patent Number: 5,635,947
[45] Date of Patent: Jun. 3, 1997

[54] EYE MOVEMENT TRACKING DISPLAY

[75] Inventor: Kazuyo Iwamoto, Tsukuba, Japan

[73] Assignee: Agency of Industrial Science & Technology, Ministry of International Trade & Industry, Tokyo, Japan

[21] Appl. No.: 291,708

[22] Filed: Aug. 16, 1994

[30] Foreign Application Priority Data

Aug. 16, 1993 [JP] Japan .................................. 5-222794

[51] Int. Cl.$^6$ .................................................. G09G 5/00
[52] U.S. Cl. ........................ 345/7; 345/8; 345/9; 348/207
[58] Field of Search ......................... 345/7, 8, 9; 348/207

[56] References Cited

U.S. PATENT DOCUMENTS

| | | | |
|---|---|---|---|
| 4,028,725 | 6/1977 | Lewis | 358/103 |
| 4,439,157 | 3/1984 | Breglia et al. | 350/174 |
| 5,091,719 | 2/1992 | Beamon, III | 345/8 |
| 5,351,143 | 9/1994 | Sato et al. | 359/51 |

*Primary Examiner*—Richard Hjerpe
*Assistant Examiner*—Vui T. Tran
*Attorney, Agent, or Firm*—Oblon, Spivak, McClelland, Maier & Neustadt, P.C.

[57] ABSTRACT

An eye movement tracking display comprises an image generator having wide view angle image generation means and narrow view angle image generation means and functioning to produce an image for display in a wearer's field of vision, an image display for displaying the image produced by the image generator to the wearer, and an eye movement detector for detecting movement of the wearer's eye. The image display comprises an image display panel for displaying a low-resolution image received from the wide view angle image generation means, image processing means electrically connected with the panel for erasing the portion of the low-resolution image displayed at the region of the panel to which the wearer's eye is directed, and an image transmission element positioned behind the image display panel for directing a high-resolution image received from the narrow view angle image generation means to the erased region of the panel.

2 Claims, 3 Drawing Sheets

EYE MOVEMENT TRACKING DISPLAY

BACKGROUND OF THE INVENTION

1. Field of the Invention

This invention relates to an eye movement tracking display for presenting a realistic visual image to a person.

2. Description of the Prior Art

Head mounted displays have been developed for visually presenting a person with a scene taken by a TV camera or with a realistic virtual image generated in a computer and displayed graphically. The head mounted display is equipped with a pair of independent TV monitors disposed one in front of each eye so as to enable the viewer to perceive a 3D sensation with stereo effects.

With such a head mounted display, when images taken by TV cameras or graphic images generated on computer displays are manipulated in accordance with movements of the viewer's head detected by a goniometer or magnetic means, the viewer is given the sensation of viewing the environment imaged by the cameras from the position of the camera or of being present in the world of imagery presented by computer graphics. Since the images are presented to the left and right eyes by two small image displays, however, the frames of the image displays are constantly within the viewer's field of view. This detracts from the sense of reality of the experience.

It is known that most human beings have a field of vision that extends ±40° from the central axis of the eyeball. Therefore, unless the head mounted display is equipped with TV monitors whose picture areas are large enough to cover this region, the viewer will be able to see the monitor frames and be given the impression of viewing the displayed images as if peering through the frames. One conceivable way of overcoming this problem is to use TV monitors with picture areas large enough to cover the maximum field of vision of humans. However, this solution is not generally feasible because of the limit on the number scanning lines that TV monitors use to display images (525 lines in the NTSC system monitors and 2,000 lines in high-definition TV monitors). Since the number of scanning lines cannot easily be increased, making the monitor large enough to cover the field of vision of the human eye would decrease its resolution, and when the resolutions decreases, the viewer sees a less distinct image that distracts from the sense of reality of the experience.

While it would be possible to overcome this problem by using TV monitors with enough scanning lines to display pictures that the human eye perceives as sharply defined even when enlarged to cover the whole of a person's field of vision, the development of such a high-resolution TV monitor is difficult with today's technology. The inventor therefore conducted studies in search of a method for expanding the current narrow field of vision of the head mounted displays without increasing the number of scanning lines and without lowering resolution.

It is known that the human eye can see an object clearly only in a small region near its view point (the position on the object toward which the central axis of the eyeball is directed). The range of this region is ordinarily ±5° of the view point and vision outside this region is blurred. From this it can be concluded that it suffices to display a high-resolution image only within the small area of clear vision in the vicinity of the view point and to display a low-resolution image over the remainder of the field of vision. The display of the high-resolution image within the small area of clear vision can be achieved by causing the high-resolution image to track the detected movement of the viewer's eye (the view point). For this it is necessary to use an image display that is able to display a high-resolution narrow view angle image only in a small area near the view point and display a low-resolution wide view angle image in the peripheral region outside the small area. No image display developed up to now is able to display images in this manner.

The present invention was accomplished in view of the foregoing circumstances and has as its object to provide an eye movement tracking display which comprises an image display able to display a wide view angle image while simultaneously displaying a high-resolution image in the vicinity of the view point of the viewer's eye and which is compact enough to be easily mounted on the viewer's head.

SUMMARY OF THE INVENTION

For achieving the aforesaid object, the present invention provides an eye movement tracking display comprising an image generator having wide view angle image generation means and narrow view angle image generation means and functioning to produce an image for display in a wearer's field of vision, an image display for displaying the image produced by the image generator to the wearer and an eye movement detector for detecting movement of the wearer's eye, wherein the image display comprises an image display panel for displaying a low-resolution image received from the wide view angle image generation means, image processing means electrically connected with the panel for erasing the portion of the low-resolution image displayed at the region of the panel to which the wearer's eye is directed, and an image transmission element positioned behind the image display panel for directing a high-resolution image received from the narrow view angle image generation means to the erased region of the panel.

In the present invention, a wide view angle image constituting the peripheral part of the overall image is displayed at low resolution on a transparent liquid crystal panel and a high-resolution narrow view angle image is transmitted through the transparent liquid crystal display via an image transmission element to be displayed at the view point of the person wearing the eye movement tracking display. Therefore, even when the eye movement tracking display is made compact in size, it can still present a highly realistic image to the person wearing it on the head.

The above and other features of the present invention will become apparent from the following description made with reference to the drawings.

DESCRIPTION OF THE PREFERRED EMBODIMENT

Figure 1:
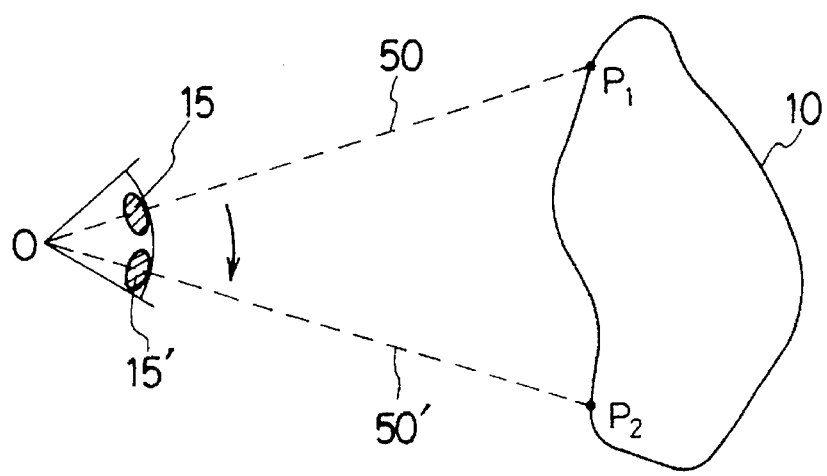
FIG. 1 is a schematic view illustrating the relationship between a viewer's eyes and view points on the object being viewed.

The principle of the eye movement tracking display according to this invention will first be explained with reference to FIGS. 1 and 2. By way of example, the case where a person views an object 10 with the naked eye will be considered. Assume that the eye is first located at the position of the reference numeral 15 where it is directed along the line (axis of vision) 50 to the point $P_1$ on the object 10 and then moved to the position 15' where it is directed along the line 50' to the position $P_2$. Owing to the characteristics of the human eye, the viewer will sense a high-resolution image of the vicinity of the point $P_1$ when the eye is in the first position and a high-resolution image of the vicinity of the point $P_2$ when it is in the second. In contrast, since the eye cannot clearly see the area surrounding the view point, it will sense a low-resolution wide view angle image of the peripheral region of either view point. Thus by constantly presenting a high-resolution image only at the view point to which the eye is directed, it is possible in effect to constantly present what the viewer perceives as a high-resolution wide view angle image.

Figure 2A:
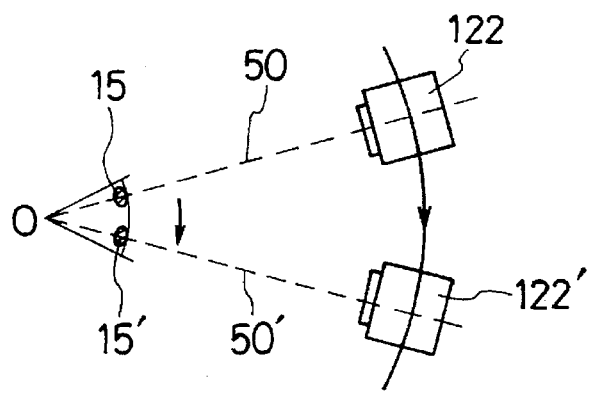
FIG. 2(a) is a schematic view illustrating the relationship between eye movement and movement of a display system.
Figure 2B:
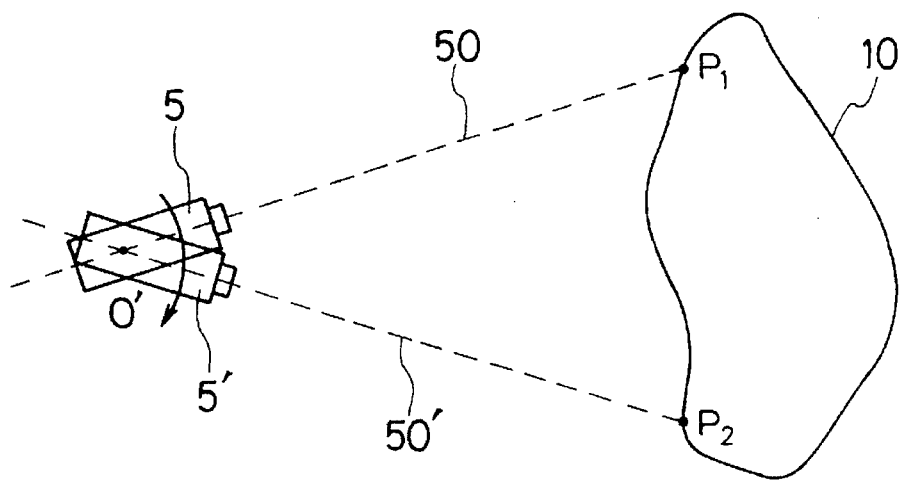
FIG. 2(b) is a schematic view showing the eyes of FIG. 1(a) replaced with an imaging system.

As an equivalent display system for this purpose consider that shown in FIG. 2. This hypothetical system consists of the display system of FIG. 2(a) in which the position of a monitor 122 follows the movement of the eye and the imaging system of FIG. 2(b) in which a camera unit 5 is positioned at a position 0' corresponding to the position 0 of the eye in FIG. 1 and has its optical axis directed along a line corresponding to the line 50 of FIG. 1. When the eye is in the position 15 of FIG. 2(a) corresponding to position 15 in FIG. 1, the camera unit 5 is directed along the line 50 in FIG. 2(b) to image the point $P_1$ and display a high-resolution view point image on the monitor 122 located on the line 50 in FIG. 2(a). Then, when the eye moves to the position 15', the movement is detected and the monitor 122 and the camera unit 5 are simultaneously controlled to track the movement by moving to the position 122' on the line 50' and to the position 5' on the line 50', respectively, whereby the camera images the point $P_2$ and displays a high-resolution view point image on the monitor 122 at the position 122'. If the monitor is large enough to cover the narrow view angle in which the eye has high acuity, the viewer using the system of FIG. 2(a) will see an image substantially the same as that seen by the viewer in FIG. 1. By moving the monitor 122 as shown in FIG. 2(a), it becomes possible for a monitor with a small picture area to present an image of the object 10 equivalent to one displayed all at one time on a fixed monitor and, assuming that the two monitors have the same number of scanning lines, to present it with higher resolution. Next, using the same method as for producing the narrow view angle image, a wide view angle image is produced to track the eye position of the viewer and displayed on a monitor large enough to cover the wide view angle in which the eye has low acuity. The narrow view angle image is inset in the wide view angle image and the superimposed images are displayed to the viewer. While the eye movement tracking display according to this invention operates on the same principle as this hypothetical system, in an actual application it is difficult to move the monitor 122 of FIG. 2(a) at the required high speed needed to track a rapidly moving eye. In this invention, therefore, an optical system is used to obtain an equivalent effect.

Figure 3:
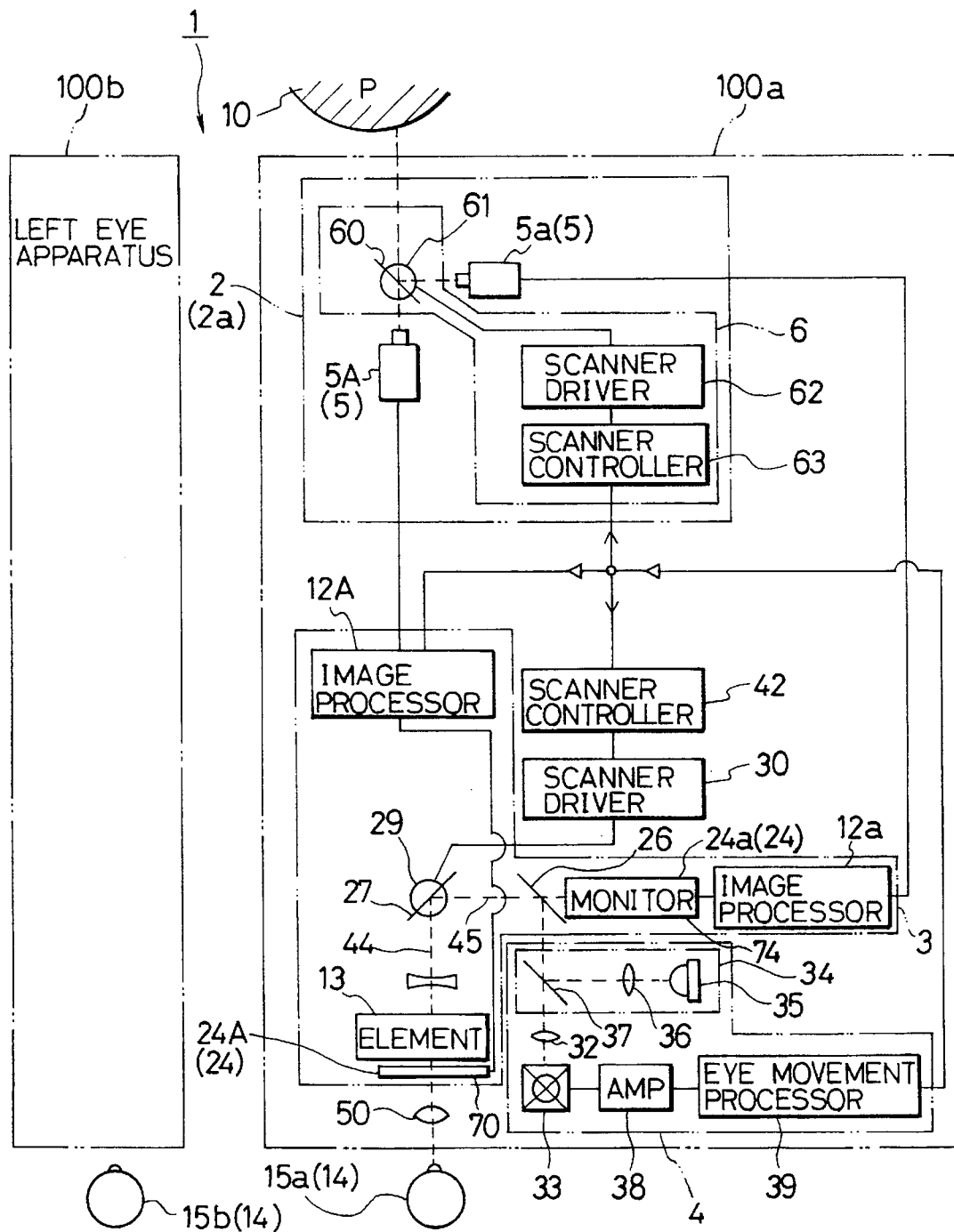
FIG. 3 is a diagram showing the configuration of an embodiment of the eye movement tracking display according to the invention.

An embodiment of the eye movement tracking display according to this invention will now be explained with reference to FIG. 3. The eye movement tracking display, designated by reference numeral 1, has a right eye apparatus 100a and a left eye apparatus 100b. The right eye apparatus 100a is for the image displayed to the right eye 15a of the person 14 wearing the eye movement tracking display and the left eye apparatus 100b is for the image displayed to the wearer's left eye 15b. Since the right and left eye apparatuses 100a and 100b are configured similarly, only the right eye apparatus 100a will be explained. The right eye apparatus 100a is equipped with an image generator 2, an image display 3 and an eye movement detector 4. The image generator 2 is primarily for generating the image to be displayed on the monitor. The image generator 2 can be configured either as a computer graphics device or as an imaging device 2a for producing an image of an object 10. In either case, the content of the image generated is intended for presentation on the axis of vision 50 and therefore changes as the axis of vision 50 moves with eye movement of the wearer 14. In the embodiment explained in the following the image generator 2 is an imaging device for producing an image of the object 10. The image display 3 is for displaying the image produced by the image generator 2 to the wearer 14, and the eye movement detector 4 is for detecting the movement of the eye and controlling the image generator 2 (imaging device) and the image display 3 based on the detected movement.

The image generator 2 is equipped with a camera unit 5 and an imaging direction controller 6 for controlling the imaging direction of the camera unit 5. In the illustrated embodiment the camera unit 5 is equipped with a wide view angle TV camera 5A and a narrow view angle TV camera 5a. The imaging direction controller 6 comprises a half mirror 60, a scanner 61, a scanner driver 62 and a scanner controller 63.

An autofocus feature of the wide view angle TV camera 5A and the narrow view angle TV camera 5a keeps them in focus on the same point P on the object 10. The wide view angle image 40 produced by the wide view angle TV camera 5A is image-processed by an image processor 12A and displayed on a wide view angle monitor 24A, while the narrow view angle image 41 produced by the narrow view angle TV camera 5a is image-processed by an image processor 12a and displayed on the monitor unit 74 of a narrow view angle monitor 24a. In preparation for later superimposition of the narrow view angle image 41 on the narrow view angle image 41, the image processor 12A erases the portion of the wide view angle image 40 where the narrow view angle image 41 is to be superimposed. The so-processed wide view angle image 40 and the narrow view angle image 41 are sent to an image display unit 24 of the image display 3.

Figure 4A:
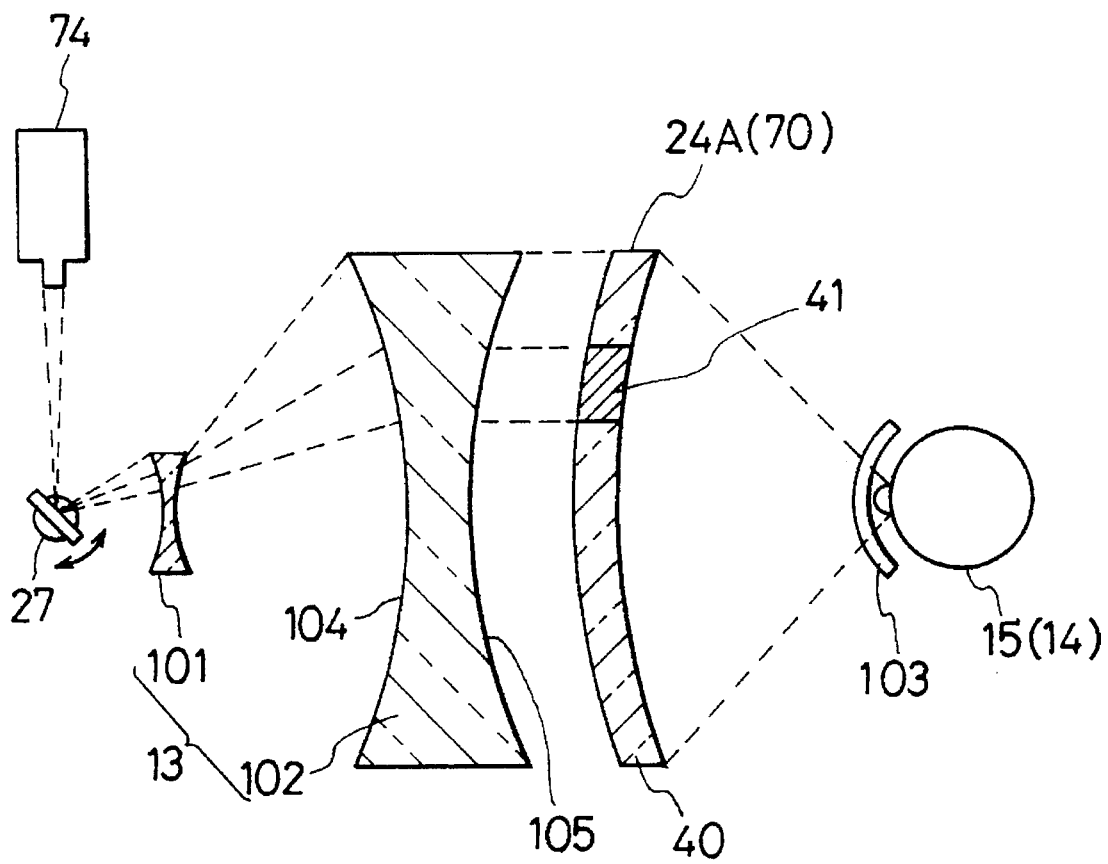
FIG. 4(a) is an enlarged view of the image transmission element of the eye movement tracking display of FIG. 3.
Figure 4B:
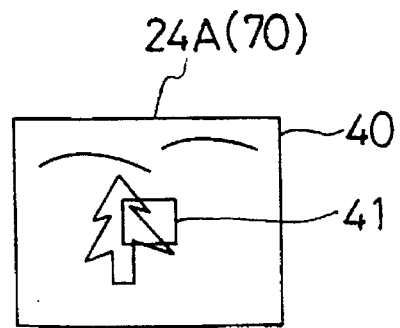
FIG. 4(b) is a view of the image display unit of the eye movement tracking display of FIG. 3.

The image display 3 comprises the image display unit 24, a half mirror 26 and a mirror 27, while the image display unit 24 comprises the narrow view angle monitor 24a and the wide view angle monitor 24A. The wide view angle monitor 24A is constituted as a transparent liquid crystal panel unit 70 which may be made up of a single panel or a plurality of synchronized panels. The wide view angle image 40 processed by the image processor 12A is displayed on the transparent liquid crystal panel unit 70 with the portion thereof to which the eye of the wearer 14 is directed erased and thus transparent. The narrow view angle monitor 24a comprises the monitor unit 74 and an image transmission element 13. As shown in FIG. 4(a), the image transmission element 13 consists of a concave lens 101 and an optical fiber 102. The concave lens 101 is positioned opposite the light-receiving surface 104 of the optical fiber 102. The diameter of the optical fiber 102 is selected based on the size of the eye and/or face of the wearer 14 and is typically about 50 mm. The light-receiving surface 104 and light-emitting surface 105 of the optical fiber 102 are both formed to be sphero-concave. The transparent liquid crystal panel unit 70 is disposed opposite the light-emitting surface 105 of the optical fiber 102 and the high-resolution narrow view angle image 41 processed by the narrow view angle monitor 24a is projected onto the rear surface of the transparent liquid crystal panel unit 70 at the erased transparent region thereof. Thus the wide view angle image 40 and the high-resolution narrow view angle image 41 are displayed to the eye 15 (wearer 14) as superimposed on the transparent liquid crystal panel unit 70 (FIG. 4(b)). If the transparent liquid crystal panel unit 70 is positioned close in front of the eye, an eyepiece 103 is provided for enabling the eye to focus on the transparent liquid crystal panel unit 70.

The mirror 27 is mounted on the drive shaft of a scanner 29 to be rotatable about two axes and the scanner 29 is driven by a scanner driver 30. The mirror 27 can be a galvanometer mirror, for example.

The eye movement detector 4 is disposed on the path of the light reflected by the half mirror 26 of the image display 3. It is equipped with a lens 32, a photodetector 33 (an ADP, infrared CCD camera or the like) and an eye illuminator 34. The eye illuminator 34 comprises an LED 35, a lens 36 and a half mirror 37. The photodetector 33 is connected through an amplifier 38 to an eye movement processor 39 whose output is forwarded to a scanner controller 42, the scanner controller 63 and the image processor 12A.

The eye movement processor 39, which can be a programmed computer, computes the position of the eye 15 and sends the computed position to the scanner controller 42, the scanner controller 63 and the image processor 12A. The scanner controller 42, which can be a programmed computer, uses the signal received from the eye movement processor 39 to calculate the amount by which the scanner 29 is to be driven and controls the operation of the scanner driver 30 accordingly.

The scanner controller 63, which can be a programmed computer, uses the signal received from the eye movement processor 39 to calculate the amount by which the scanner 61 is to be driven and controls the scanner driver 62 accordingly. (In FIG. 3, the solid lines indicate electrical lines and the broken lines optical axes.)

The manner in which the eye movement tracking display 1 of the foregoing configuration displays images to the wearer 14 will now be explained. The object 10 located apart from the eye movement tracking display 1 is imaged by the wide view angle TV camera 5A. The image signal produced by the wide view angle TV camera 5A is processed by the wide view angle image processor 12A and displayed on the transparent liquid crystal panel unit 70 of the wide view angle monitor 24A. The processing operations conducted by the image processor 12A include erasing a portion of the picture displayed on the transparent liquid crystal panel unit 70 and eliminating noise components. The object 10 is also imaged by the narrow view angle TV camera 5a and, after being processed by the image processor 12A, the resulting image signal is displayed on the monitor unit 74 of the narrow view angle monitor 24a. The processing operations conducted by the image processor 12a include reduction of the narrow view angle image and noise elimination. The image displayed on the monitor unit 74 of the narrow view angle monitor 24a passes through the half mirror 26, is reflected by the mirror 27 along the optical path 44, advances to the light-receiving surface 104 of the image transmission element 13, exits from the light-emitting surface 105, and advances to the transparent liquid crystal panel unit 70. The wide view angle image 40 and the narrow view angle image 41 are superimposed on the transparent liquid crystal panel unit 70 with the narrow view angle image 41 fitted into the removed portion of the wide view angle image 40 to produce a composite image which is focused on the retina of the eye of the wearer 14. As a result, a composite image consisting of a view point image of the view point P on the object 10 and an image of the peripheral region surrounding the view point P is formed in front of the eye 15 of the wearer 14. At the same time, the position of the eye 15 is determined by the eye movement detector 4. More specifically, the LED 35 of the eye movement detector 4 emits an infrared beam which passes through the lens 36, is reflected by the half mirror 37, is reflected by the half mirror 26 along the optical path 45, and is then reflected by the mirror 27 along the same optical path as the image to pass through the image transmission element 13 and illuminate the eye 15. The infrared light reflected by the eye 15 passes back along the same optical path to the half mirror 37 and then passes through the half mirror 37 to the eye movement detector 4, where it passes through the lens 32 into the photodetector 33. The signal produced by the photodetector 33, which varies with variation in the position of the eye 15, is sent through the amplifier 38 to the eye movement processor 39, which calculates the position of the eye 15. When the wearer 14 looks at another point, i.e. when the wearer's eye moves, the image of the eye 15 illuminated by the infrared light can, owing to the bidirectional nature of light, pass into the image transmission element 13 from the light-emitting surface 105, exit from the light-receiving surface 104, be reflected by the mirror 27 and the mirror 27, and pass through the half mirror 37 into the eye movement detector 4. In the eye movement detector 4, the image of the eye 15 passes through the lens 32 to the photodetector 33 where it is detected. The resulting image signal is amplified by the amplifier 38 and forwarded to the eye movement processor 39, which determines the amount of movement of the eye 15 and its new position. The resulting eye position signal is sent to the imaging direction controller 6, which responds by redirecting the narrow view angle TV camera 5a to the direction in which the eye 15 has been redirected.

As a result, the axis of vision of the wearer 14 and that of the narrow view angle TV camera 5a coincide and only the image information in the direction in which the eye is directed is imaged by the narrow view angle TV camera 5a and displayed on the monitor unit 74 of the narrow view angle monitor 24a.

On the other hand, the movement of the eye 15 of the wearer 14 changes the optical path 44 between the eye 15 and the narrow view angle monitor 24a and, therefore, the eye 15 can no longer see the center of the narrow view angle monitor 24a. The axis of vision of the eye 15 is therefore redirected to the center of the monitor unit 74 of the narrow view angle monitor 24a by rotating the mirror 27 by an angle equal to one-half the rotation angle θ of the eye 15 calculated by the eye movement processor 39, i.e. by θ/2.

For achieving this control, the scanner driver 30 drives the scanner 29 in accordance with the eye position signal received from the scanner controller 42. When the axis of vision of the eye 15 is brought into coincidence with the center of the monitor unit 74 of the narrow view angle monitor 24a in this way, the images on the wide view angle monitor 24A (transparent liquid crystal panel unit 70) and the monitor unit 74 are displayed to the eye 15, whereby composite image information corresponding to the images taken by the TV cameras 5a, 5A is formed in front of the eye. The eye movement tracking display 1 according to this invention thus enables only the images in the direction in which the eye is directed to be displayed to the eye, irrespective of eye movement. The apparatus thus produces an effect equivalent to that of FIG. 2(a).

Although a system was explained in which the narrow view angle TV camera 5a is controlled in the direction in which the eye is directed for displaying an image on the monitor unit 74 of the narrow view angle monitor 24a, it is alternatively possible to constitute a virtual reality system by controlling computer graphic images in accordance with the eye position signal.

According to the eye movement tracking display of this invention, a wide view angle image constituting a peripheral background is displayed at low resolution on a transparent liquid crystal panel and a narrow view angle image of the view point is produced at high resolution on a monitor and is further displayed by transmission through the transparent liquid crystal panel using an image transmission element, whereby the wearer of the apparatus can be presented with a highly realistic image even without using monitors with an increased number of scanning lines. Further, since the apparatus is compact in size, it can be easily mounted on the head of the wearer.

Japanese Patent Application No. 5-222794 filed Aug. 16, 1994 is hereby incorporated by reference.

What is claimed is:

1. An eye movement tracking display comprising:

an image generator having wide view angle image generation means and narrow view angle image generation means and functioning to produce an image for display in a wearer's field of vision, an image display for displaying the image produced by the image generator to the wearer, and an eye movement detector for detecting movement of the wearer's eye, the image display comprising a transparent liquid crystal panel having a front surface directed to the wearer's eye for displaying a low-resolution image received from the wide view angle image generation means, image processing means electrically connected with the eye movement detector for receiving an output signal from the eye movement detector and electrically connected with the panel for erasing by the output signal a portion of the low-resolution image displayed at a region of the panel to which the wearer's eye is directed, and an image transmission element positioned behind the panel for directing from behind the panel a high-resolution image received from the narrow view angle image generation means to the erased region of the panel.

2. An eye movement tracking display according to claim 1, wherein the image transmission element includes an optical fiber having a sphero-concave light-emitting surface and a sphero-concave light-receiving surface and a concave lens.

* * * * *